US012617578B2

(12) United States Patent
Kastanek

(10) Patent No.: US 12,617,578 B2
(45) Date of Patent: May 5, 2026

(54) TRAY WITH DIVIDER FEATURES

(71) Applicant: Graphic Packaging International, LLC, Atlanta, GA (US)

(72) Inventor: Raymond S. Kastanek, Mead, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/604,702

(22) Filed: Mar. 14, 2024

(65) Prior Publication Data

US 2024/0308723 A1 Sep. 19, 2024

Related U.S. Application Data

(60) Provisional application No. 63/452,852, filed on Mar. 17, 2023.

(51) Int. Cl.

| | |
|---|---|
| ***B65D 5/4805*** | (2006.01) |
| ***B31B 50/26*** | (2017.01) |
| ***B65D 5/20*** | (2006.01) |
| *B31B 105/00* | (2017.01) |
| *B31B 120/20* | (2017.01) |

(52) U.S. Cl.

CPC .......... *B65D 5/48022* (2013.01); *B31B 50/26* (2017.08); *B65D 5/2047* (2013.01); *B31B 2105/00* (2017.08); *B31B 2120/20* (2017.08)

(58) Field of Classification Search

CPC ...... B65D 5/2047; B65D 5/18; B65D 5/0015; B65D 5/56; B65D 5/4266; B65D 5/48022

USPC ........................ 229/120.02, 120.38; 206/518

See application file for complete search history.

(56) References Cited

U.S. PATENT DOCUMENTS

| | | | |
|---|---|---|---|
| 2,110,681 | A | 3/1938 | Rutledge |
| 2,663,449 | A | 12/1953 | Delle |
| 3,104,012 | A | 9/1963 | Beamish |
| 3,154,215 | A | 10/1964 | Le Vesconte |
| 3,358,900 | A | 12/1967 | Perdue et al. |
| 3,489,331 | A | 1/1970 | Andersson et al. |

(Continued)

FOREIGN PATENT DOCUMENTS

| | | |
|---|---|---|
| CA | 2 814 149 A1 | 4/2012 |
| CN | 203450620 U | 2/2014 |

(Continued)

OTHER PUBLICATIONS

International Search Report and Written Opinion for PCT/US2024/019844 dated Jul. 5, 2024.

(Continued)

*Primary Examiner* — Javier A Pagan

(74) *Attorney, Agent, or Firm* — Andrew N. Claerbout; FisherBroyles, LLP

(57) ABSTRACT

A tray for holding one or more food products includes a plurality of panels including a central panel, at least one end panel, at least one side panel, and at least one bottom panel, a sidewall extending at least partially around an interior of the tray and including the at least one end panel and the at least one side panel, a flange extending outwardly from the sidewall and including the central panel, a bottom wall including the at least one bottom panel, and divider features including at least one divider in the interior of the tray, the at least one divider extending upwardly from the bottom wall.

44 Claims, 4 Drawing Sheets

(56) References Cited

U.S. PATENT DOCUMENTS

| | | | |
|---|---|---|---|
| D219,263 | S | 11/1970 | Castelli |
| 3,575,338 | A | 4/1971 | Dilot |
| 3,640,188 | A | 2/1972 | Dilot |
| D224,662 | S | 8/1972 | Swett |
| D232,302 | S | 8/1974 | Lazure |
| 3,863,862 | A | 2/1975 | Gordon |
| 3,893,882 | A | 7/1975 | Repenning |
| 3,941,301 | A | 3/1976 | Jorgensen |
| 4,046,310 | A | 9/1977 | Gustafsson |
| 4,057,380 | A | 11/1977 | Hosoe |
| 4,081,125 | A | 3/1978 | Meyers |
| 4,130,236 | A | 12/1978 | Manizza |
| D251,951 | S | 5/1979 | Florian |
| 4,177,715 | A | 12/1979 | Meyers |
| 4,202,465 | A | 5/1980 | McLaren |
| D257,109 | S | 9/1980 | Conti |
| 4,241,863 | A | 12/1980 | Faller |
| 4,279,354 | A | 7/1981 | Conti |
| 4,283,427 | A | 8/1981 | Winters et al. |
| 4,305,542 | A | 12/1981 | Benzschawel et al. |
| 4,308,985 | A | 1/1982 | Manizza |
| 4,325,905 | A | 4/1982 | Takahashi |
| 4,351,473 | A | 9/1982 | Manizza |
| 4,533,065 | A | 8/1985 | Chazal et al. |
| 4,555,381 | A | 11/1985 | Chazal et al. |
| 4,574,174 | A | 3/1986 | McGonigle |
| D284,727 | S | 7/1986 | Gerber |
| 4,718,596 | A | 1/1988 | Muller et al. |
| D302,068 | S | 7/1989 | Forbes, Jr. |
| 4,848,648 | A | 7/1989 | Elsman |
| 4,903,842 | A | 2/1990 | Tokuda |
| 4,943,456 | A | 7/1990 | Pollart et al. |
| 4,944,451 | A | 7/1990 | Forbes, Jr. |
| 5,000,374 | A | 3/1991 | Deiger |
| 5,002,826 | A | 3/1991 | Pollart et al. |
| 5,002,833 | A | 3/1991 | Kinsey, Jr. et al. |
| 5,009,939 | A | 4/1991 | Goldberg |
| 5,118,747 | A | 6/1992 | Pollart et al. |
| D332,393 | S | 1/1993 | Boone |
| 5,203,491 | A | 4/1993 | Marx et al. |
| 5,253,801 | A | 10/1993 | Bernstein et al. |
| 5,326,021 | A | 7/1994 | Farrell |
| 5,351,879 | A | 10/1994 | Liu |
| 5,356,070 | A | 10/1994 | Rigby |
| 5,410,135 | A | 4/1995 | Pollart et al. |
| 5,412,187 | A | 5/1995 | Walters et al. |
| D363,192 | S | 10/1995 | Reeves |
| D367,172 | S | 2/1996 | Brightbill |
| 5,530,231 | A | 6/1996 | Walters et al. |
| D372,170 | S | 7/1996 | Ahern, Jr. |
| 5,533,622 | A | 7/1996 | Stockley, III |
| 5,533,623 | A | 7/1996 | Fischer |
| 5,538,179 | A | 7/1996 | Cai |
| 5,588,583 | A | 12/1996 | Cargile, Jr. |
| 5,647,168 | A | 7/1997 | Gilbert |
| D420,855 | S | 2/2000 | Hurley |
| 6,092,687 | A | 7/2000 | Hupp et al. |
| 6,116,501 | A | 9/2000 | Hupp |
| 6,204,492 | B1 | 3/2001 | Zeng et al. |
| 6,234,386 | B1 | 5/2001 | Drummond et al. |
| D448,130 | S | 9/2001 | Wagner |
| 6,433,322 | B2 | 8/2002 | Zeng et al. |
| 6,552,315 | B2 | 4/2003 | Zeng et al. |
| D484,364 | S | 12/2003 | Bailey |
| 6,677,563 | B2 | 1/2004 | Lai |
| D549,457 | S | 8/2007 | Dretzka |
| D595,155 | S | 6/2009 | Larson |
| D633,341 | S | 3/2011 | Smyers |
| D643,311 | S | 8/2011 | Meyers |
| D656,789 | S | 4/2012 | Locke |
| D658,933 | S | 5/2012 | Woodard |
| D688,572 | S | 8/2013 | Marin |
| D688,921 | S | 9/2013 | Miros |
| 8,534,460 | B2 | 9/2013 | Wnek et al. |
| D693,180 | S | 11/2013 | Peterson |
| 8,801,995 | B2 | 8/2014 | Wnek et al. |
| D712,153 | S | 9/2014 | Lee |
| D713,741 | S | 9/2014 | Wilmers |
| 9,783,345 | B2 | 10/2017 | Bentham |
| D897,847 | S | 10/2020 | Glassman |
| D962,008 | S | 8/2022 | Moore |
| D970,977 | S | 11/2022 | Glupker |
| D1,004,431 | S | 11/2023 | Kastanek et al. |
| 2005/0031814 | A1 | 2/2005 | Dawes |
| 2007/0116806 | A1 | 5/2007 | Parsons |
| 2008/0035634 | A1 | 2/2008 | Zeng et al. |
| 2011/0174676 | A1 | 7/2011 | Stockhaus |
| 2011/0259784 | A1 | 10/2011 | Tye et al. |
| 2012/0248180 | A1 | 10/2012 | White et al. |
| 2013/0327821 | A1 | 12/2013 | Zwaga et al. |
| 2014/0124406 | A1 | 5/2014 | Ishikawa |
| 2014/0183198 | A1 | 7/2014 | Slack |
| 2014/0224866 | A1 | 8/2014 | Littlejohn et al. |
| 2015/0225120 | A1 | 8/2015 | Wnek et al. |
| 2015/0375889 | A1 | 12/2015 | Brockman |
| 2017/0341355 | A1 | 11/2017 | Peiffer et al. |
| 2018/0022529 | A1 | 1/2018 | Tye |
| 2018/0319568 | A1 | 11/2018 | Tye |
| 2020/0047940 | A1 | 2/2020 | Tye et al. |
| 2020/0047975 | A1 | 2/2020 | Tye et al. |
| 2020/0255200 | A1 | 8/2020 | Mondini et al. |
| 2022/0055789 | A1 | 2/2022 | Mero |
| 2022/0289459 | A1* | 9/2022 | Kastanek ........... B65D 5/48022 |
| 2022/0348376 | A1 | 11/2022 | Tye et al. |

FOREIGN PATENT DOCUMENTS

| | | | | |
|---|---|---|---|---|
| DE | 100 22 552 | | 11/2001 | |
| EP | 0052021 | A1 | 1/1985 | |
| EP | 0 671 332 | A1 | 9/1995 | |
| EP | 0729893 | A2 * | 9/1996 | ........... B65D 5/0263 |
| EP | 1 104 744 | A2 | 6/2001 | |
| EP | 1113969 | B1 * | 11/2003 | ......... B65D 5/48018 |
| EP | 3871989 | A1 * | 9/2021 | ........... B65D 5/2047 |
| EP | 009090848-0001 | | 8/2022 | |
| EP | 009090848-0002 | | 8/2022 | |
| FR | 2 133 727 | | 12/1972 | |
| FR | 2 406 522 | | 5/1979 | |
| FR | 2 826 938 | | 1/2003 | |
| FR | 2 933 329 | | 1/2010 | |
| GB | 1 314 148 | | 4/1973 | |
| GB | 1 501 764 | | 2/1978 | |
| GB | 1 602 625 | | 11/1981 | |
| GB | 2 487 765 | A | 8/2012 | |
| GB | 2 550 386 | A | 11/2017 | |
| JP | H06-42636 | | 6/1994 | |
| JP | 2000-141511 | | 5/2000 | |
| JP | 2000-190948 | A | 7/2000 | |
| JP | 2001-002056 | A | 1/2001 | |
| JP | 2001-233322 | A | 8/2001 | |
| JP | 2001-233324 | A | 8/2001 | |
| JP | 2001-278246 | A | 10/2001 | |
| JP | 2002-347746 | A | 12/2002 | |
| JP | 2006-298395 | A | 11/2006 | |
| KR | 10-1539187 | B1 | 7/2015 | |
| TW | M 295475 | U | 8/2006 | |
| TW | M 301016 | U | 11/2006 | |
| WO | WO 2003/041945 | | 5/2003 | |
| WO | WO 2007/127371 | | 11/2007 | |
| WO | WO 2009/138786 | | 11/2009 | |
| WO | WO 2012/049005 | | 4/2012 | |
| WO | WO 2013/002639 | | 1/2013 | |
| WO | WO 2014/032059 | A1 | 2/2014 | |
| WO | WO 2014/066867 | A1 | 5/2014 | |
| WO | WO 2015/009518 | | 1/2015 | |
| WO | WO 2019/094057 | A1 | 5/2016 | |
| WO | WO 2018/017783 | A1 | 1/2018 | |
| WO | WO 2018/178508 | A1 | 10/2018 | |
| WO | WO 2019/020863 | | 1/2019 | |
| WO | WO 2019/092323 | A1 | 5/2019 | |
| WO | WO 2020/033350 | | 2/2020 | |

(56) References Cited

FOREIGN PATENT DOCUMENTS

| | | | |
|---|---|---|---|
| WO | WO 2020/033352 | | 2/2020 |
| WO | WO 2021-209610 | A1 | 10/2021 |

OTHER PUBLICATIONS

PaperSeal Original Tray, available Apr. 28, 2023, [online], [site visited Apr. 28, 2023]. Available from internet, URL: https://www.graphicpkg.com/products/paperseal-original/ (Year: 2023).
Compartment K&K Paper Tray 2100ml, available Apr. 28, 2023, [online], [site visited Apr. 28, 2023]. Available from internet, URL: https://goodwillretail.co.th/ehop/2-compartment-kk-paper-tray-2100ml/ (Year: 2023).

* cited by examiner

TRAY WITH DIVIDER FEATURES

CROSS-REFERENCE TO RELATED APPLICATION

The present application claims the benefit of U.S. Provisional Patent Application No. 63/452,852, filed on Mar. 17, 2023.

INCORPORATION BY REFERENCE

The disclosures of each of U.S. patent application Ser. No. 17/690,204, filed on Mar. 9, 2022, U.S. patent application Ser. No. 16/532,819, filed on Aug. 6, 2019, U.S. patent application Ser. No. 16/037,425, filed Jul. 17, 2018, U.S. patent application Ser. No. 15/654,814, filed Jul. 20, 2017, and U.S. patent application Ser. No. 12/992,131, filed Feb. 11, 2011, PCT Patent Application No. PCT/GB/09/50506, filed May 13, 2009, and U.S. Provisional Patent Application No. 63/452,852, filed on Mar. 17, 2023, are hereby incorporated by reference for all purposes as if presented herein in their entirety.

BACKGROUND OF THE DISCLOSURE

The present disclosure relates to blanks, containers, trays, constructs, and various features and methods for forming a container from a blank. More specifically, the disclosure is generally directed to trays with divider features.

SUMMARY OF THE DISCLOSURE

According to one aspect, the disclosure is generally directed to a tray for holding one or more food products, the tray comprising a plurality of panels comprising a central panel, at least one end panel, at least one side panel, and at least one bottom panel, a sidewall extending at least partially around an interior of the tray and comprising the at least one end panel and the at least one side panel, a flange extending outwardly from the sidewall and comprising the central panel, a bottom wall comprising the at least one bottom panel, and divider features comprising at least one divider in the interior of the tray, the at least one divider extending upwardly from the bottom wall.

According to another aspect, the disclosure is generally directed to a blank for forming a tray for holding one or more food products, the blank comprising a plurality of panels comprising a central panel, at least one end panel, at least one side panel, and at least one bottom panel, the at least one end panel and the at least one side panel for being arranged to at least partially forming a sidewall extending at least partially around an interior of the tray formed from the blank, the central panel for being arranged to at least partially form a flange extending outwardly from the sidewall when the tray is formed from the blank, the at least one bottom panel for being arranged to form a bottom wall of the tray formed from the blank, and divider features for forming at least one divider extending upwardly from the bottom wall in the interior of the tray when the tray is formed from the blank.

According to another aspect, the disclosure is generally directed to a method of forming a tray for holding one or more food products, the method comprising obtaining a blank, the blank comprising a plurality of panels comprising a central panel, at least one end panel, at least one side panel, and at least one bottom panel, the blank further comprising divider features, arranging the at least one end panel and the at least one side panel to form a sidewall extending at least partially around an interior of the tray, arranging the central panel to form a flange extending outwardly from the sidewall, arranging the at least one bottom panel to form a bottom wall of the tray, and forming at least one divider extending upwardly from the bottom wall in the interior of the tray.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure relates generally to various aspects of containers, constructs, trays, materials, packages, elements, and articles, and methods of making such containers, constructs, trays, materials, packages, elements, and articles. Although several different aspects, implementations, and embodiments are disclosed, numerous interrelationships between, combinations thereof, and modifications of the various aspects, implementations, and embodiments are contemplated hereby. In one illustrated embodiment, the present disclosure relates to forming a container or tray for holding food items or various other articles. However, in other embodiments, the container or tray can be used to form other non-food containing articles or may be used for heating or cooking.

Trays described herein can be used for holding one or more articles such as food products, e.g., portioned retail food products that can include one or more of cookies, crackers, cakes, pastries, candies, nuts, popcorn, trail mix, gum, etc. In some embodiments, the articles can include frozen or non-frozen food products that can be provided in discrete portions, for example, chicken nuggets, French fries, onion rings, mozzarella sticks, chips, popcorn, other finger foods, etc. In embodiments, other types of articles that can include food products and/or non-food products can be placed in the tray for service to a customer. In some embodiments, such products can be contained in additional packaging and then placed in the tray. The tray could be otherwise shaped and arranged and could be used to hold other products and/or articles in similar or different environments without departing from the disclosure.

Figure 1:
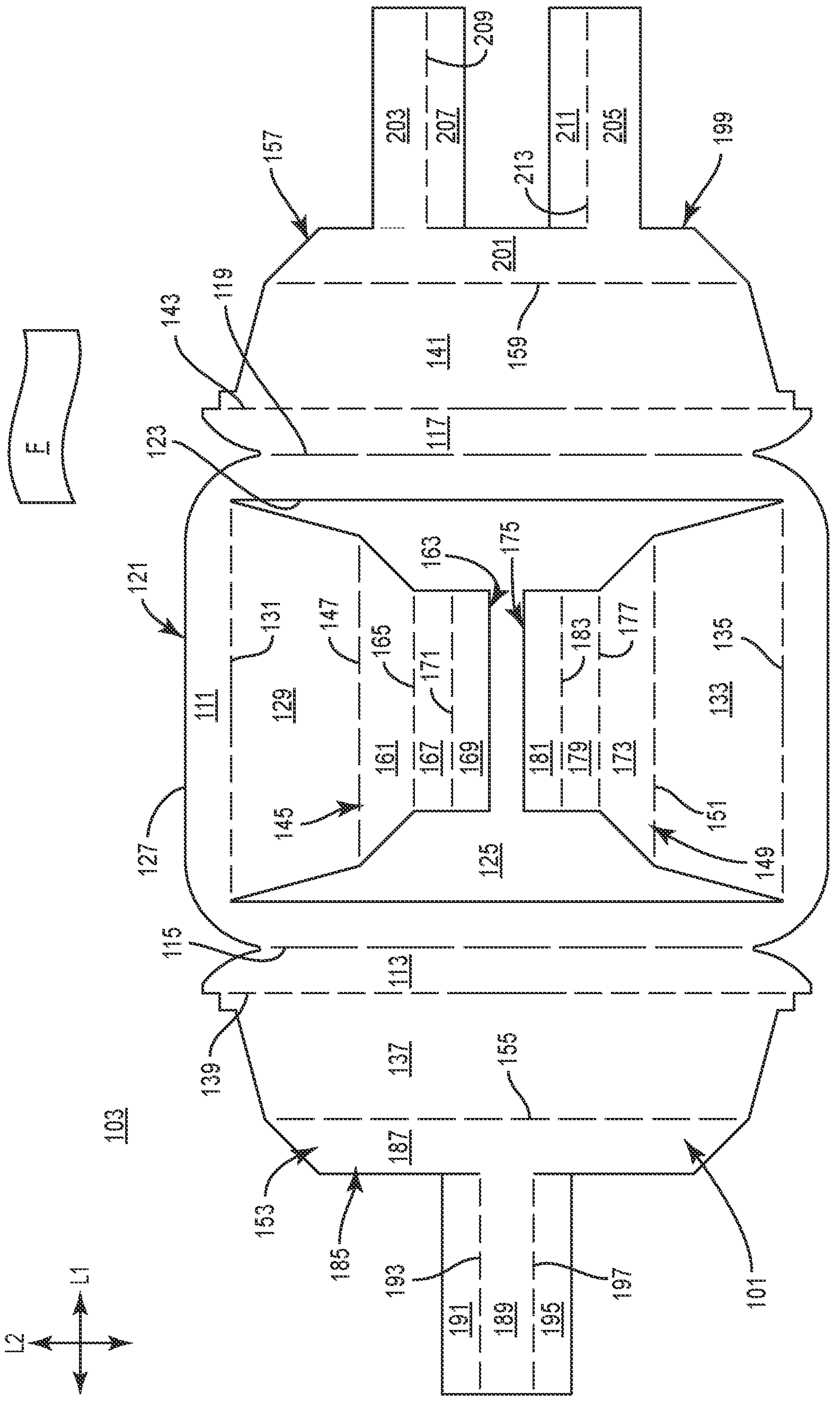
FIG. 1 is a plan view of a blank for forming a tray according to an exemplary embodiment of the disclosure.

FIG. 1 illustrates an exterior surface 101 of a first blank 103 for forming a tray 105 (FIG. 2) or other container according to an exemplary embodiment of the disclosure. In one embodiment, the blank 103 comprises paperboard (e.g., solid bleached sulphate folding boxboard), or other suitable material that can be recyclable and/or suitable for use in an oven (not shown).

The blank 103 can, in some embodiments, be provided with a liner F that comprises a plastic layer such as polyethylene, a polyethylene terephthalate (PET) material, or any other thermoplastic material, or a bioplastic, such as vegetable oil or starch based plastics. In one embodiment, such liner can comprise polyethylene that can be softened and fused to the blank 103. In an alternative embodiment, a liner for being attached to the blank 103 can comprise PET or a similar material that is at least partially attached to the blank 103 by a heat seal layer (e.g., a thermoformable sealant grade transparent polyester packaging film, such as Mylar® XMPOL12 available from DuPont Teijin Films U.S. Limited Partnership of Hopewell, Virginia, or any suitable thermoformable sealant or adhesive, any suitable heat or pressure activated adhesive, or any other suitable material), wherein a PET liner can be more suitable for uses that require heating of the container in an oven.

Such a liner can be at least partially attached to the blank 103 for being positioned in contact with one or more food products held in the tray 105 (e.g., during heating). In one embodiment, after heating the food product, the blank 103 and an accompanying liner F can be separated to allow both the blank 103 and the liner to be disposed of (e.g., recycled, renewed, reused, etc.) separately. Optionally, the blank 103 can be provided separately from or without the liner.

The blank 103 can be formed from a single ply of material, such as but not limited to paperboard, cardboard, paper, a polymeric sheet, and/or a laminate that includes more than one layer. In some embodiments, the blank 103 can include a microwave interactive layer (not shown) such as is common in MicroRite® containers available from Graphic Packaging International of Atlanta, GA. The microwave interactive layer can be commonly referred to as, or can have as one of its components, a susceptor, a foil, a microwave shield, or any other term or component that refers to a layer of material suitable for shielding microwave energy and/or causing heating in a microwave oven.

As shown in FIG. 1, the blank 103 has a longitudinal direction L1 and a lateral direction L2. In the illustrated embodiment, the blank 103 and tray 105 formed therefrom includes a plurality of panels comprising a central panel 111, a first attachment panel 113 foldably connected to the central panel 111 at a lateral fold line 115, and a second attachment panel 117 foldably connected to the central panel 111 at a lateral fold line 119. In some embodiments, the attachment panels 113, 117 can be considered portions of the central panel 111.

As shown, a peripheral region of the central panel 111 can form a rim or flange 121 of the blank 103/tray 105. As also shown, an interior edge 123 of the central panel 111 can at least partially define and/or circumscribe an opening 125. The flange 121 can also at least partially define an exterior edge 127 of the central panel 111. In some embodiments, the exterior edge 127 can at least partially be defined by the fold lines 115, 119.

The plurality of panels of the blank 103 and tray 105 formed therefrom can also include a first end panel 129 (broadly, "first panel") foldably connected to the central panel 111 at a longitudinal fold line 131 (broadly, "first fold line") extending along the opening 125 and a second end panel 133 (broadly, "first panel") foldably connected to the central panel 111 at a longitudinal fold line 135 (broadly, respective "first fold line") extending along the opening 125 for at least partially forming an interior 107 of the tray 105.

A first side panel 137 (broadly, "second panel") can be foldably connected to the attachment panel 113 at a lateral fold line 139, and a second side panel 141 (broadly, "second panel") can be foldably connected to the attachment panel 117 at a lateral fold line 143.

A first bottom panel 145 can be foldably connected to the first end panel 129 at a longitudinal fold line 147, and a second bottom panel 149 (broadly, "fourth bottom panel") can be foldably connected to the second end panel 133 at a longitudinal fold line 151.

With continued reference to FIG. 1, a third bottom panel 153 (broadly, "second bottom panel") can be foldably connected to the first side panel 137 at a lateral fold line 155, and a fourth bottom panel 157 (broadly, "third bottom panel") can be foldably connected to the second side panel 141 at a lateral fold line 159.

The blank 103 and tray 105 formed therefrom can include divider forming features for forming respective dividers in the interior 107 of the tray 105. In particular, the bottom panels 145, 149, 153, 157 can be provided with divider forming features that cooperate with one another to form dividers 217 (broadly, "first divider"), 219 (broadly, "first divider" or "second divider"), 221 (broadly, "second divider" or "third divider"), 223 (broadly, "fourth divider") in the interior 107 of the tray 105. As also described herein, the bottom panels 145, 149, 153, 157 can be provided with bottom wall forming features that cooperate with each other to form a bottom wall 225 of the tray 105 formed from the blank 103.

The bottom panel 145 can include a bottom wall forming portion 161 foldably connected to the end panel 129 at the fold line 147, and a divider forming portion 163 foldably connected to the bottom wall forming portion 161 at a longitudinal fold line 165. The divider forming portion 163 can include a first section 167 (broadly, "first divider forming portion") foldably connected to the bottom wall forming portion 161 at the fold line 165, and a second section 169 (broadly, "second divider forming portion") foldably connected to the first section 167 at a longitudinal fold line 171.

Similarly, the bottom panel 149 can include a bottom wall forming portion 173 foldably connected to the end panel 133 at the fold line 151, and a divider forming portion 175 foldably connected to the bottom wall forming portion 173 at a longitudinal fold line 177. The divider forming portion 175 can include a first section 179 (broadly, "first divider forming portion") foldably connected to the bottom wall forming portion 173 at the fold line 177, and a second section 181 (broadly, "second divider forming portion") foldably connected to the first section 179 at a longitudinal fold line 183.

The bottom panel 153 can include a bottom wall forming portion 185 foldably connected to the side panel 137 at the lateral fold line 155, the bottom wall forming portion 185 having a base section 187 proximate the fold line 155 and a distal section 189 extending longitudinally away from the base section 187.

A first divider forming portion 191 of the bottom panel 153 can be foldably connected to the distal section 189 of the bottom wall forming portion 185 at a longitudinal fold line 193, and a second divider forming portion 195 can be foldably connected to the distal section 189 of the bottom wall forming portion 185 at a longitudinal fold line 197.

The bottom panel 157 can include a bottom wall forming portion 199 foldably connected to the side panel 141 at the lateral fold line 159, the bottom wall forming portion 199 having a base section 201 proximate the fold line 159 and a pair of laterally spaced distal sections 203, 205 (broadly, respective "first bottom wall forming portion" and "second bottom wall forming portion") extending longitudinally away from the base section 201 in spaced relation.

A first divider forming portion 207 of the bottom panel 157 can be foldably connected to the distal section 203 of the bottom wall forming portion 199 at a longitudinal fold line 209, and a second divider forming portion 211 can be foldably connected to the distal section 205 of the bottom wall forming portion 199 at a longitudinal fold line 213.

Figure 2:
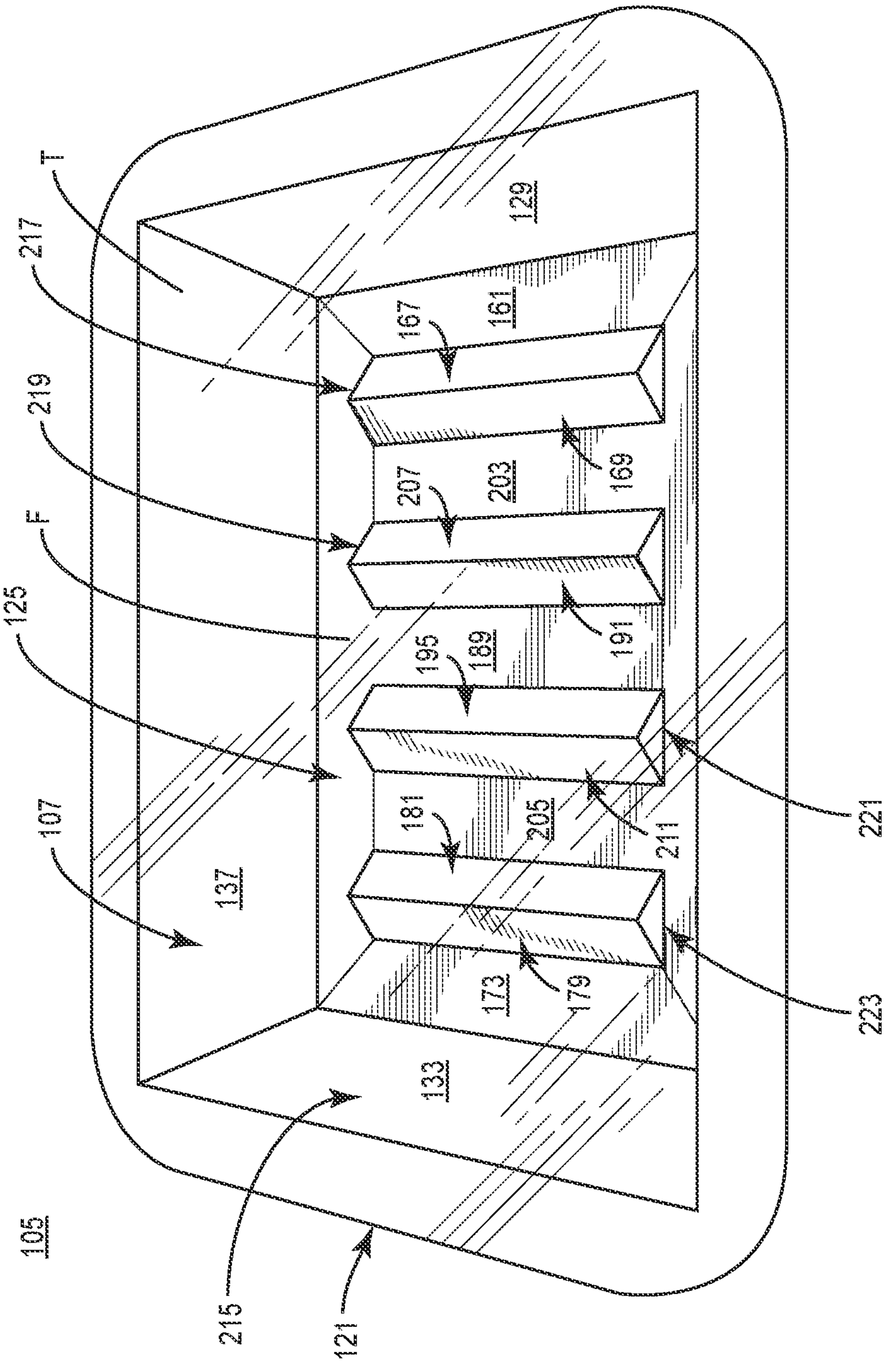
FIG. 2 is a perspective view of a tray formed from the blank of FIG. 1 according to an exemplary embodiment of the disclosure.
Figure 3:
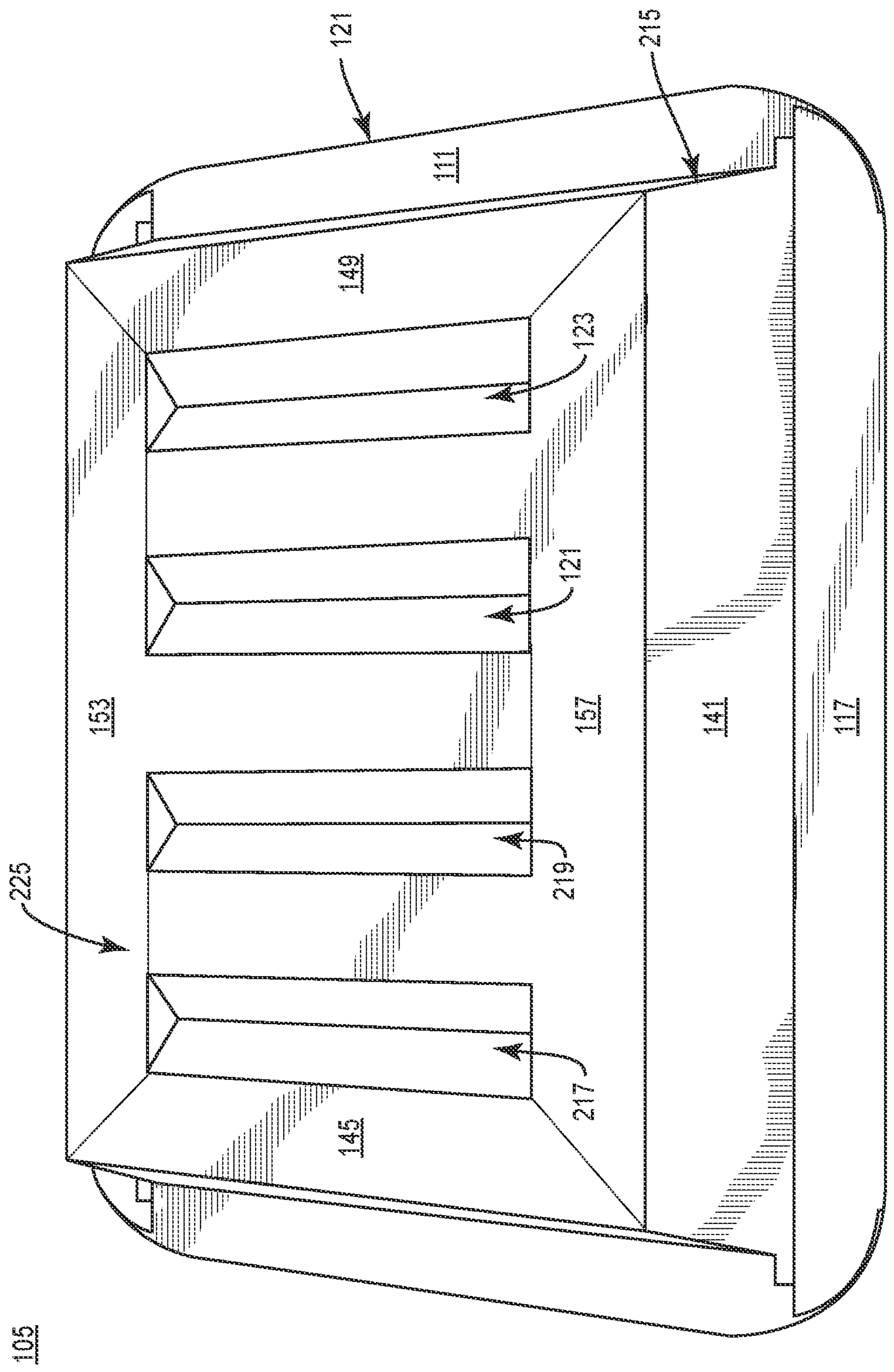
FIG. 3 is another perspective view of a tray formed from the blank of FIG. 1 according to an exemplary embodiment of the disclosure.

With additional reference to FIGS. 2 and 3, according to one embodiment, the attachment panels 113, 117 can be folded at the respective fold lines 115, 119 into underlying and at least partial face-to-face contact with respective portions of the central panel 111.

The end panels 129, 133 can be folded downwardly at the respective fold lines 131, 135 away from the central panel 111/opening 125, and the side panels 137, 141 can be folded at the respective fold lines 139, 143 toward an engagement with the downwardly-depending end panels 129, 133.

In this regard, an edge or surface of each of the side panels 137, 141 can intersect an edge or surface of the respective end panels 129, 133 to form a sidewall 215 of the tray 105 that extends at least partially around the interior 107 of the tray 105.

Furthermore, the bottom panels 145, 149 can be folded at the respective fold lines 147, 151 such that the respective bottom wall forming portions 161, 173 thereof are arranged into a generally spaced and parallel arrangement with the central panel 111, with an edge or surface of each of the respective bottom wall forming portions 161, 173 intersecting an edge or surface of the respective side panels 137, 141.

Similarly, the bottom panels 153, 157 can be folded at the respective fold lines 155, 159 such that the respective bottom wall forming portions 185, 199 thereof are arranged into a generally spaced and parallel arrangement with the central panel 111, with an edge or surface of each of the respective bottom wall forming portions 185, 199 intersecting an edge or surface of the respective side panels 137, 141.

The divider forming portion 163 of the bottom panel 145 can be arranged such that the first section 167 is folded at least partially upwardly at the fold line 165 into a generally oblique arrangement with the bottom wall forming portion 161, and such that the second section 169 is folded at least partially downwardly at the fold line 171 so as to be in a generally oblique arrangement with the first section 167 to form a divider 217 in the interior 107 of the tray 105. In some embodiments, an edge or surface of the second section 169 of the bottom panel 145 can contact an edge or surface of the bottom panels 153, 157.

The divider forming portion 207 of the bottom panel 157 can be folded at least partially upwardly at the fold line 209 into a generally oblique arrangement with the bottom wall forming portion 199 of the bottom panel 157. The divider forming portion 191 of the bottom panel 153 can be folded at least partially upwardly at the fold line 193 into a generally oblique arrangement with both the bottom wall forming portion 185 of the bottom panel 153 and the divider forming portion 207 of the bottom panel 157 to form a divider 219 in the interior 109 of the tray 105. In some embodiments, an edge or surface of the divider forming portion 191 of the bottom panel 153 can contact an edge or surface of the divider forming portion 207 of the bottom panel 157.

Similarly, the divider forming portion 195 of the bottom panel 153 can be folded at least partially upwardly at the fold line 197 into a generally oblique arrangement with the bottom wall forming portion 185 of the bottom panel 153. The divider forming portion 211 of the bottom panel 157 can be folded at least partially upwardly at the fold line 213 into a generally oblique arrangement with both the bottom wall forming portion 199 of the bottom panel 157 and the divider forming portion 195 of the bottom panel 153 to form a divider 221 in the interior 109 of the tray 105. In some embodiments, an edge or surface of the divider forming portion 211 of the bottom panel 157 can contact an edge or surface of the divider forming portion 195 of the bottom panel 153.

The divider forming portion 175 of the bottom panel 149 can be arranged such that the first section 179 is folded at least partially upwardly at the fold line 177 into a generally oblique arrangement with the bottom wall forming portion 173, and such that the second section 181 is folded at least partially downwardly at the fold line 183 so as to be in a generally oblique arrangement with the first section 179 to form a divider 223 in the interior 107 of the tray 105. In some embodiments, an edge or surface of the second section 181 of the bottom panel 149 can contact an edge or surface of the bottom panels 153, 157.

The aforementioned arrangement of panels and features can be at least partially maintained with one or more applications of an adhesive such as glue. In some embodiments, and as described further below, a forming system can be provided with features that facilitate the arrangements of panels, end flaps, and features of the blank 103 to form the tray 105.

The erected configuration of the tray 105 provides a bottom wall 225 formed by the overlapping arrangement of the bottom panels 145, 149, 153, 157, and from which the dividers 217, 219, 221, 223 extend at least partially to provide compartments or partitions in the interior 107 of the tray 105.

In some embodiments, the respective bottom wall forming portions 161, 173, 189, 203, 205 of the respective bottom panels 145, 149, 153, 157 can form the bottom wall 225 of the tray 105, and the dividers 217, 219, 221, 223 can be positioned extending upwardly from the bottom wall 225 of the tray 105. In other embodiments, one or more of the dividers 217, 219, 221, 223 can form a portion of the bottom wall 225 of the tray 105.

In some embodiments, one or more spaces or gaps between the respective dividers 217, 219, 221, 223 and the remainder of the tray 105 can provide one or more paths of egress, for example, for ventilation, draining of fluids, etc.

In some embodiments, a compartment can be at least partially defined between the divider 217 and a portion of the sidewall 215 of the tray 105, a compartment can be formed between the divider 217 and the divider 219, a compartment can be formed between the divider 219 and the divider 221, a compartment can be formed between the divider 221 and the divider 223, and a compartment can be formed between the divider 223 and a portion of the sidewall 215. It will be understood that a different arrangement of compartments can be formed in the interior 107 of the tray 105 without departing from the disclosure.

In some embodiments, the dividers 217, 219, 221, 223 can provide such partitions in the interior 107 of the tray 105 to at least partially separate one or more food products such as cookies or other pastries, crackers, chips, snacks, candy, other food items, etc., in the interior 107 of the tray 105.

Furthermore, the overlapping arrangement of the end panels 129, 133 and side panels 137, 141 provides the tray 105 with a robust construction that resists deformation, bending, crushing etc. In this regard, one or more of the end panels 129, 133 and side panels 137, 141 can be considered reinforcing features of the tray 105.

As shown in FIG. 2, in some embodiments, a lid/lid structure such as a lidding film T can comprise packaging film that is a thin plastic layer used to preserve and protect a food item contained in the tray 105 and can be removably attached to the flange 121 of the tray 105, e.g., defined by a portion of the central panel 111. Such a lidding film T can cover the flange 121 of the tray 105 so as to cover the interior 107 of the tray 105. In some embodiments, a hermetic seal of the interior 107 of the tray 105 can be achieved by such engagement by a lidding film T.

Any plastic film, such as polyethylene, polypropylene, polyethylene terephthalate, polyvinylchloride, polyamide, and ethylene vinyl alcohol, or other suitable material, can be used for forming the lidding film that is sealed against the sealing surface of the flange/central panel 111. Further, adhesives can be used between the lidding film and the sealing surface of the flange/central panel without departing from the disclosure.

With continued reference to FIG. 3, it will be understood that, in embodiments, a liner such as liner F can be applied to at least the interior 107 of the tray 105, and can overlie seams/points of intersection between the respective panels, e.g., such that the tray 105 has leak-resistant properties. The tray 105 is illustrated with the liner F applied to one or more interior surfaces thereof in FIG. 7. The liner F can be separably connected to one or more surfaces of the tray 105 along the interior 107 thereof, for example, so that the liner F and tray 105 can be separately disposed of after use. In this regard, the separable arrangement of the tray 105 and the liner F can facilitate the separate reuse, renewal, recycling, etc. of the paperboard material that forms the tray 105 and the polymeric material that forms the liner F, without commingling thereof.

In one embodiment, the tray 105 can be formed similarly to the formation of the containers as shown and described in the incorporated-by-reference applications (e.g., the '425 Application, the '814 Application, and/or the '131 Application).

Figure 4:
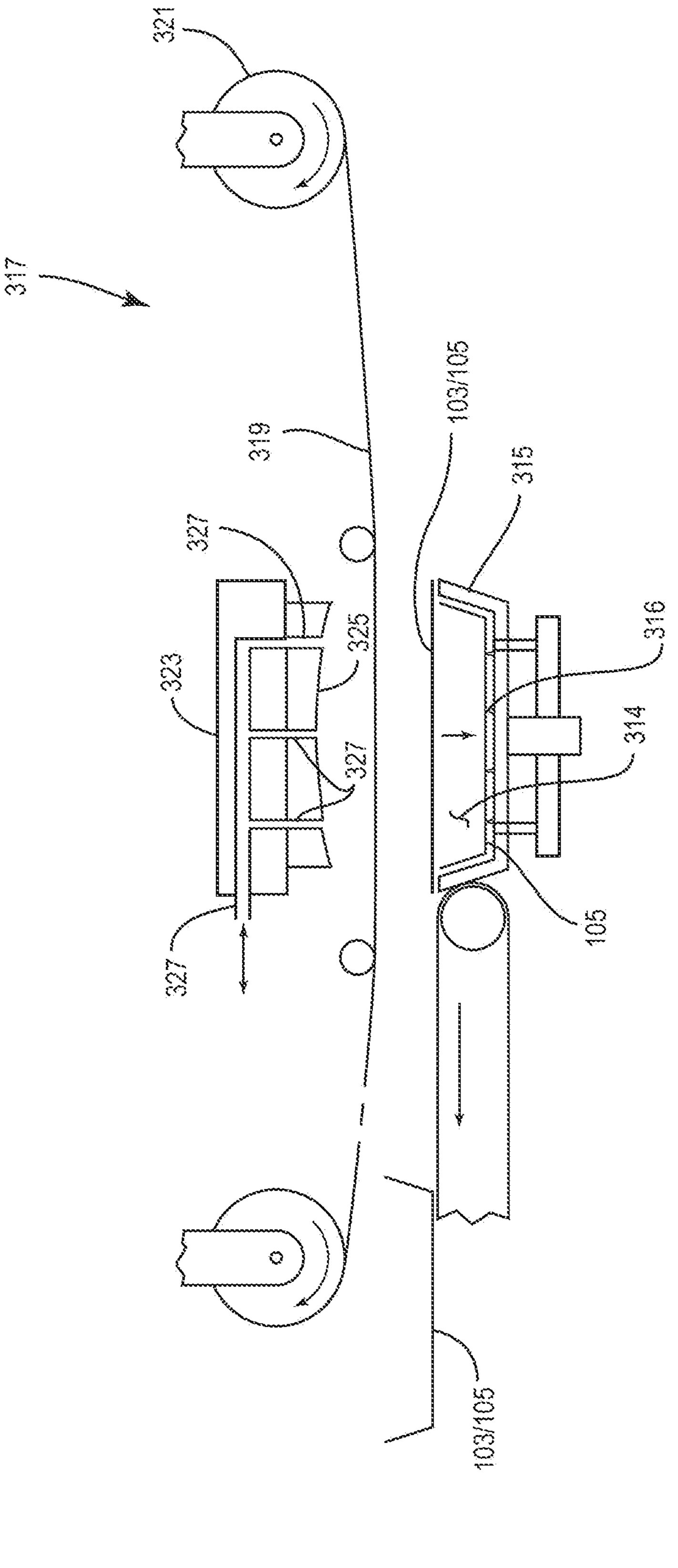
FIG. 4 is a schematic view of an apparatus for processing a blank and/or tray that can be used with exemplary embodiments of the present disclosure.

In an exemplary embodiment shown schematically in FIG. 4, the blank 103/tray 105 or a folded configuration thereof can be placed on a lower die 315 of a system 317 and a liner material or film sheet 319 (e.g., a polyethylene or PET web) can be fed from a supply roller 321 above the blank 103/folded blank 103. An upper die 323 has a heater plate surface 325 having a PTFE coating, for example a Teflon® coating. Alternatively, the heater plate surface 325 could have a coating of any suitable material or the coating could be omitted.

As schematically shown in FIG. 4, the upper die 323 can include a plurality of holes or ducts 327 in the heater plate surface 325 for applying a vacuum and/or air pressure on the sheet 319. The lower die 315 and/or the upper die 323, including the ducts 327 and/or the heater plate 325, could be otherwise shaped, arranged, positioned, and/or configured without departing from the disclosure. For example, the heater plate 325 could be omitted and the heat could be alternatively applied to the sheet 319 (e.g., with a flow of hot air).

In the illustrated embodiment, the lower die 315 can hold the blank 103/folded blank 103 over a cavity 314 in the lower die 315 while supporting the blank 103/tray 105 at the central panel 111 and/or the attachment panels 113, 117 (e.g., so that the central panel 111 is facing upwardly). An initial vacuum can be applied to ducts 327 to draw the film sheet 319 toward the upper die 323, the upper die 323 can be heated to a suitable temperature to soften the film sheet 319 and/or to activate a heat seal layer. Instead of, or in addition to, the initial vacuum, air pressure under the film sheet 319 can be employed with similar or equal effect. Subsequently, the film sheet 319 can be forced downwardly (e.g., by air pressure applied by the ducts 327 and/or a vacuum applied from below the blank 103/tray 105).

The air pressure can move the film sheet 319 toward the blank 103/tray 105 and the lower die 315 can support the blank 103/tray 105 as the film sheet 319 is applied to portions of one or more of the flange 121, the end panels 129, 133, and the side panels 137, 141 to form the liner F.

As shown, in some embodiments, the lower die 315 (broadly, "forming die") can be provided with a plurality of protrusions 316 extending upwardly into the cavity 314 to facilitate formation of one or more of the dividers 217, 219, 221, 223. For example, the protrusions 316 can provide respective raised surfaces over which: the first section 167 and second section 169 of the divider forming portion 163 of the bottom panel 145 can be folded at the respective fold lines 165, 171 to form the divider 217; the divider forming portion 207 of the bottom panel 157 and the divider forming portion 191 of the bottom panel 153 can be folded at the respective fold lines 209, 193 to form the divider 219, the divider forming portion 195 of the bottom panel 153 and the divider forming portion 211 of the bottom panel 157 can be folded at the respective fold lines 197, 213 to form the divider 221; and the first section 179 and second section 181 of the divider forming portion 175 of the bottom panel 149 can be folded at the respective fold lines 177, 183 to form the divider 223. In this regard, the respective protrusions 316 can be generally wedge-shaped, as shown, or can have a different configuration, e.g., posts, ribs, etc. to facilitate such formation of the dividers 217, 219, 221, 223.

In some embodiments, the liner F can help retain the tray 105 in its tray shape after the liner F is applied to the blank 103/folded blank 103/tray 105. For example, in some embodiments, the attachment of the liner F to the tray 105 can at least partially maintain the oblique arrangement of the divider forming portions 191, 207 and divider forming portions 195, 211.

In some embodiments, the tray 105 can be ejected from the lower die 315 and transported away from the forming tool on a conveyor, for example.

In one embodiment, the tray 105 can be formed from the blank 103 and have the liner F applied thereto at a much higher rate than systems that separately form the tray 105 from the blank 103 blank and then place that formed tray 105 into the lower die 315. In one example, the tray 105 of the present embodiment can be formed from the blank 103 together with the liner F at a rate of approximately 200 trays per minute. The tray 105 could be otherwise formed without departing from the disclosure. For example, the tray 105 could be formed from the blank 103 prior to applying the liner F (e.g., prior to engaging the lower die 315).

Any of the features of the various embodiments of the disclosure can be combined with, replaced by, or otherwise configured with other features of other embodiments of the disclosure without departing from the scope of this disclosure.

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

Any of the blanks, trays, or other constructs of this disclosure may optionally include one or more features that alter the effect of microwave energy during the heating or cooking of a food item that is associated with the tray or other construct. For example, the blank, tray, container, or other construct may be formed at least partially from one or more microwave energy interactive elements (hereinafter sometimes referred to as "microwave interactive elements") that promote heating, browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

In the case of a susceptor or shield, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

The use of other microwave energy interactive elements is also contemplated. In one example, the microwave energy interactive element may comprise a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Atlanta, GA) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas may be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. Nos. 5,412,187, 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

All dimensional information presented herein is intended to be illustrative of certain aspects, features, etc., of various embodiments of the disclosure, and is not intended to limit the scope of the disclosure. The dimensions of the blanks, containers, forming tools, features, or any other dimension, can be more or less than what is shown and described in this disclosure without departing from the scope of this disclosure and can be within the listed ranges of dimensions for each feature or outside the listed ranges of dimensions for each feature without departing from the scope of this disclosure.

The blanks according to the present invention can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blanks. The blanks may also be coated with, for example, a moisture barrier layer, on either or both sides of the blanks.

In accordance with the exemplary embodiments, the blanks may be constructed of paperboard of a caliper such that it is heavier and more rigid than ordinary paper. The blanks can also be constructed of other materials, such as cardboard, hard paper, or any other material having properties suitable for enabling the carton package to function at least generally as described above.

The foregoing description illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments. Additionally, the disclosure shows and describes only selected embodiments, but various other combinations, modifications, and environments are contemplated and are within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A tray for holding one or more food products, the tray comprising:

a plurality of panels comprising a central panel, at least one end panel, at least one side panel, and at least one bottom panel;

a sidewall extending at least partially around an interior of the tray and comprising the at least one end panel and the at least one side panel;

a flange extending outwardly from the sidewall and comprising the central panel;

a bottom wall comprising the at least one bottom panel; and divider features comprising at least one divider in the interior of the tray, the at least one divider extending upwardly from the bottom wall, the at least one bottom panel comprises a bottom wall forming portion at least partially forming the bottom wall and at least one divider forming portion at least partially forming the at least one divider, the at least one divider forming portion is a first divider forming portion and a second divider forming portion.

2. The tray of claim 1, wherein the first divider portion and the second divider portion extend obliquely upwardly from the bottom wall forming portion in the interior of the tray.

3. The tray of claim 2, wherein the first divider forming portion is foldably connected to the bottom wall forming portion, and the second divider forming portion is foldably connected to the first divider forming portion, the first divider forming portion and the second divider forming portion obliquely arranged to form the at least one divider.

4. The tray of claim 2, wherein the at least one divider is first divider extending upwardly from the bottom wall and the divider features further comprise a second divider extending upwardly from the bottom wall, the first divider forming portion is foldably connected to the bottom wall forming portion of the at least one bottom panel and at least partially forming the first divider, and the second divider forming portion is foldably connected to the bottom wall forming portion and extending obliquely upwardly from the bottom wall forming portion in the interior of the tray to at least partially form the second divider.

5. The tray of claim 2, wherein the at least one divider is first divider extending upwardly from the bottom wall and the divider features further comprise a second divider extending upwardly from the bottom wall, the bottom wall forming portion is a first bottom wall forming portion and the at least one bottom panel further comprises a second bottom wall forming portion spaced apart from the first bottom wall forming portion, the first divider forming portion is foldably connected to the first bottom wall forming portion and at least partially forming the first divider, and the second divider forming portion is foldably connected to the second bottom wall forming portion and extending obliquely upwardly from the second bottom wall forming portion in the interior of the tray to at least partially form the second divider.

6. The tray of claim 2, wherein the at least one bottom panel is a first bottom panel and the plurality of panels further comprises a second bottom panel at least partially forming the bottom wall, the second bottom panel comprises a bottom forming portion and at least one divider forming portion foldably connected to the bottom forming portion of the second bottom panel, the at least one divider forming portion of the first bottom panel and the at least one divider forming portion of the second bottom panel obliquely arranged to form the at least one divider.

7. The tray of claim 2, wherein the at least one bottom panel is a first bottom panel, and the plurality of panels further comprises a second bottom panel, a third bottom panel, and a fourth bottom panel, each of the first bottom panel, the second bottom panel, the third bottom panel, and the fourth bottom panel comprising a respective bottom forming portion and a respective at least one divider forming portion foldably connected to the respective bottom forming portion, the at least one divider is a first divider and the divider features further comprise a second divider, a third divider, and a fourth divider in the interior of the tray and extending upwardly from the bottom wall, the at least one divider forming portion of the first bottom panel arranged to at least partially form the first divider, the at least one divider forming portion of the second bottom panel arranged to at least partially form the second divider, the at least one divider forming portion of the third bottom panel arranged to at least partially form the third divider, and the at least one divider forming portion of the fourth bottom panel arranged to at least partially form the fourth divider.

8. The tray of claim 7, wherein the at least one divider forming portion of the second bottom panel is a first divider portion at least partially forming the second divider and the second bottom panel further comprises a second divider forming portion at least partially forming the third divider.

9. The tray of claim 8, wherein the at least one divider forming portion of the third bottom panel is a first divider forming portion at least partially forming the second divider and the third bottom panel further comprises a second divider forming portion at least partially forming the third divider.

10. The tray of claim 9, wherein the first divider forming portion of the second bottom panel is obliquely arranged with the first divider forming portion of the third bottom panel to form the second divider.

11. The tray of claim 10, wherein the second divider forming portion of the second bottom panel is obliquely arranged with the second divider forming portion of the third bottom panel to form the third divider.

12. The tray of claim 2, wherein the at least one end panel and the at least one side panel extend downwardly from the central panel.

13. The tray of claim 12, wherein the at least one end panel is foldably connected to the central panel and the at least one side panel is foldably connected to an attachment panel overlapping the central panel.

14. The tray of claim 13, wherein the central panel at least partially defines an outer edge and an inner edge circumscribing an opening, the at least one end panel is foldably connected to the inner edge of the central panel.

15. The tray of claim 2, further comprising a liner separably attached to at least a portion of a respective panel of the plurality of panels.

16. A blank for forming a tray for holding one or more food products, the blank comprising:

a plurality of panels comprising a central panel, at least one end panel, at least one side panel, and at least one bottom panel, the at least one end panel and the at least one side panel for being arranged to at least partially forming a sidewall extending at least partially around an interior of the tray formed from the blank, the central panel for being arranged to at least partially form a flange extending outwardly from the sidewall when the tray is formed from the blank, the at least one bottom panel for being arranged to form a bottom wall of the tray formed from the blank; and divider features for forming at least one divider extending upwardly from the bottom wall in the interior of the tray when the tray is formed from the blank, the at least one bottom panel comprises a bottom wall forming portion for at least partially forming the bottom wall and at least one divider forming portion for at least partially forming the at least one divider, the at least one divider forming portion is a first divider forming portion and a second divider forming portion.

17. The blank of claim 16, wherein the first divider forming portion is foldably connected to the bottom wall forming portion, and the second divider forming portion is foldably connected to the first divider forming portion, the first divider forming portion and the second divider forming portion for being obliquely arranged to form the at least one divider when the tray is formed from the blank.

18. The blank of claim 16, wherein the at least one divider is a first divider for being formed by the divider features extending upwardly from the bottom wall when the tray is formed from the blank, the first divider forming portion is foldably connected to the bottom wall forming portion of the at least one bottom panel for at least partially forming the first divide when the tray is formed from the blank, and the second divider forming portion is foldably connected to the bottom wall forming portion for extending obliquely upwardly from the bottom wall forming portion in the interior of the tray to at least partially form a second divider when the tray is formed from the blank.

19. The blank of claim 16, wherein the at least one divider is a first divider for being formed by the divider features extending upwardly from the bottom wall when the tray is formed from the blank, the bottom wall forming portion is a first bottom wall forming portion and the at least one bottom panel further comprises a second bottom wall forming portion spaced apart from the first bottom wall forming portion, the first divider forming portion is foldably connected to the first bottom wall forming portion for at least partially forming the first divider when the tray is formed from the blank, and the second divider forming portion is foldably connected to the second bottom wall forming portion for extending obliquely upwardly from the second bottom wall forming portion in the interior of the tray to at least partially form a second divider when the tray is formed from the blank.

20. The blank of claim 16, wherein the at least one bottom panel is a first bottom panel and the plurality of panels further comprises a second bottom panel for at least partially forming the bottom wall when the tray is formed from the blank, the second bottom panel comprises a bottom forming portion and at least one divider forming portion foldably connected to the bottom forming portion of the second bottom panel, the at least one divider forming portion of the first bottom panel and the at least one divider forming portion of the second bottom panel for being obliquely arranged to form the at least one divider when the tray is formed from the blank.

21. The blank of claim 16, wherein the at least one bottom panel is a first bottom panel, and the plurality of panels further comprises a second bottom panel, a third bottom panel, and a fourth bottom panel, each of the first bottom panel, the second bottom panel, the third bottom panel, and the fourth bottom panel comprising a respective bottom forming portion and a respective at least one divider forming portion foldably connected to the respective bottom forming portion, the divider features are for forming the at least one divider being a first divider when the tray is formed from the blank, and the divider features are further for forming a second divider, a third divider, and a fourth divider in the interior of the tray and extending upwardly from the bottom wall when the tray is formed from the blank, the at least one divider forming portion of the first bottom panel for being arranged to at least partially form the first divider when the tray is formed from the blank, the at least one divider forming portion of the second bottom panel for being arranged to at least partially form the second divider when the tray is formed from the blank, the at least one divider forming portion of the third bottom panel for being arranged to at least partially form the third divider when the tray is formed from the blank, and the at least one divider forming portion of the fourth bottom panel for being arranged to at least partially form the fourth divider when the tray is formed from the blank.

22. The blank of claim 21, wherein the at least one divider forming portion of the second bottom panel is a first divider portion for at least partially forming the second divider when the tray is formed from the blank and the second bottom panel further comprises a second divider forming portion for at least partially forming the third divider when the tray is formed from the blank.

23. The blank of claim 22, wherein the at least one divider forming portion of the third bottom panel is a first divider forming portion for at least partially forming the second divider when the tray is formed from the blank and the third bottom panel further comprises a second divider forming portion for at least partially forming the third divider when the tray is formed from the blank.

24. The blank of claim 16, wherein the at least one end panel is foldably connected to the central panel and the at least one side panel is foldably connected to an attachment panel overlapping the central panel when the tray is formed from the blank.

25. The blank of claim 24, wherein the central panel at least partially defines an outer edge and an inner edge circumscribing an opening, the at least one end panel is foldably connected to the inner edge of the central panel.

26. The blank of claim 16, in combination with a liner separably attached to at least a portion of a respective panel of the plurality of panels.

27. A method of forming a tray for holding one or more food products, the method comprising:

obtaining a blank, the blank comprising a plurality of panels comprising a central panel, at least one end panel, at least one side panel, and at least one bottom panel, the blank further comprising divider features;

arranging the at least one end panel and the at least one side panel to form a sidewall extending at least partially around an interior of the tray;

arranging the central panel to form a flange extending outwardly from the sidewall;

arranging the at least one bottom panel to form a bottom wall of the tray; and forming at least one divider extending upwardly from the bottom wall in the interior of the tray, the at least one bottom panel comprises a bottom wall forming portion and at least one divider forming portion for at least partially forming the at least one divider, the at least one divider forming portion is a first divider forming portion and a second divider forming portion, the arranging the at least one bottom panel comprises arranging the bottom wall forming portion to at least partially form the bottom wall, and the forming the at least one divider comprises positioning the at least one divider forming portion at least partially forming the at least one divider.

28. The method of claim 27, wherein forming the at least one divider comprises positioning the at least one divider forming portion extending obliquely upwardly from the bottom wall forming portion in the interior of the tray.

29. The method of claim 28, wherein forming the at least one divider comprises positioning the at least one divider forming portion on a protrusion extending upwardly from a forming die.

30. The method of claim 28, wherein the first divider forming portion is foldably connected to the bottom wall forming portion, and the second divider forming portion is foldably connected to the first divider forming portion, and forming the at least one divider comprises obliquely arranging the first divider forming portion and the second divider forming portion.

31. The method of claim 30, wherein forming the at least one divider comprises obliquely arranging the first divider forming portion and the second divider forming portion on a protrusion extending upwardly from a forming die.

32. The method of claim 28, wherein the at least one divider is first divider extending upwardly from the bottom wall and the method further comprises forming a second divider extending upwardly from the bottom wall, the first divider forming portion is foldably connected to the bottom wall forming portion of the at least one bottom panel and at least partially forming the first divider, and the second divider forming portion is foldably connected to the bottom wall forming portion, forming the second divider comprises positioning the second divider forming portion extending obliquely upwardly from the bottom wall forming portion in the interior of the tray to at least partially form the second divider.

33. The method of claim 28, wherein the at least one divider is first divider extending upwardly from the bottom wall and the method further comprises forming a second divider extending upwardly from the bottom wall, the bottom wall forming portion is a first bottom wall forming portion and the at least one bottom panel further comprises a second bottom wall forming portion spaced apart from the first bottom wall forming portion, the first divider forming portion is foldably connected to the first bottom wall forming portion and at least partially forming the first divider, the second divider forming portion is foldably connected to the second bottom wall forming portion, and the method comprises positioning the second divider forming portion extending obliquely upwardly from the second bottom wall forming portion in the interior of the tray.

34. The method of claim 28, wherein the at least one bottom panel is a first bottom panel and the plurality of panels further comprises a second bottom panel, the second bottom panel comprises a bottom forming portion and at least one divider forming portion foldably connected to the bottom forming portion of the second bottom panel, forming the bottom wall comprises positioning the second bottom panel, and forming the at least one divider comprises obliquely arranging the at least one divider forming portion of the first bottom panel and the at least one divider forming portion of the second bottom panel.

35. The method of claim 34, wherein forming the at least one divider comprises obliquely arranging the at least one divider forming portion of the first bottom panel and the at least one divider forming portion of the second bottom panel on a protrusion extending upwardly from a forming die.

36. The method of claim 28, wherein the at least one bottom panel is a first bottom panel, and the plurality of panels further comprises a second bottom panel, a third bottom panel, and a fourth bottom panel, each of the first bottom panel, the second bottom panel, the third bottom panel, and the fourth bottom panel comprising a respective bottom forming portion and a respective at least one divider forming portion foldably connected to the respective bottom forming portion, the at least one divider is a first divider and the method further comprises forming a second divider, a third divider, and a fourth divider in the interior of the tray and extending upwardly from the bottom wall, forming the first divider comprises arranging the at least one divider forming portion of the first bottom panel, forming the second divider comprises arranging the at least one divider forming portion of the second bottom panel, forming the third divider comprises arranging the at least one divider forming portion of the third bottom panel, and forming the fourth bottom panel comprises arranging the at least one divider forming portion of the fourth bottom panel.

37. The method of claim 36, wherein the at least one divider forming portion of the second bottom panel is a first divider portion at least partially forming the second divider and the second bottom panel further comprises a second divider forming portion, forming the third divider comprises arranging the second divider forming portion of the second bottom panel.

38. The method of claim 37, wherein the at least one divider forming portion of the third bottom panel is a first divider forming portion at least partially forming the second divider and the third bottom panel further comprises a second divider forming portion, forming the third divider comprises arranging the second divider forming portion of the third bottom panel.

39. The method of claim 38, wherein forming the second divider comprises obliquely arranging the first divider forming portion of the second bottom panel with the first divider forming portion of the third bottom panel.

40. The method of claim 39, wherein forming the third divider comprises obliquely arranging the second divider forming portion of the second bottom panel with the second divider forming portion of the third bottom panel.

41. The method of claim 28, wherein forming the sidewall comprises positioning the at least one end panel and the at least one side panel extend downwardly from the central panel.

42. The method of claim 41, wherein the at least one end panel is foldably connected to the central panel and the at least one side panel is foldably connected to an attachment panel, and the method comprises overlapping the attachment panel and the central panel.

43. The method of claim 42, wherein the central panel at least partially defines an outer edge and an inner edge circumscribing an opening, the at least one end panel is foldably connected to the inner edge of the central panel.

44. The method of claim 28, further comprising separably attaching a liner to at least a portion of a respective panel of the plurality of panels.

* * * * *